United States Patent [19]
Smartt et al.

[11] Patent Number: 5,297,845
[45] Date of Patent: Mar. 29, 1994

[54] MOUNTING ARRANGEMENT FOR AUTOMOTIVE VEHICLE BODY PANELS

[75] Inventors: William V. Smartt, Southfield; Joel T. Pierce, Dearborn; Peter L. Jensen, Livonia, all of Mich.

[73] Assignee: Ford Motor Company, Dearborn, Mich.

[21] Appl. No.: 43,684

[22] Filed: Apr. 8, 1993

[51] Int. Cl.⁵ .............................................. B62D 25/16
[52] U.S. Cl. ................................... 296/191; 280/154
[58] Field of Search ................. 296/191, 198, 196, 29; 280/848, 153.5, 154, 160; 403/396, 384, 187, 188

[56] References Cited

U.S. PATENT DOCUMENTS

| | | | |
|---|---|---|---|
| 726,345 | 4/1903 | Ray | 280/154 |
| 4,529,244 | 7/1985 | Zaydel | 296/191 |
| 4,687,217 | 8/1987 | Stewart | 280/153 |
| 4,784,430 | 11/1988 | Biermacher | 296/198 |
| 4,895,405 | 1/1990 | Sasatake et al. | 293/102 |
| 4,973,102 | 11/1990 | Bien | 296/187 |
| 5,228,742 | 7/1993 | Johnson et al. | 296/191 |

FOREIGN PATENT DOCUMENTS 1-197182 8/1989 Japan.
2-41986 2/1990 Japan.

*Primary Examiner*—Robert R. Song
*Attorney, Agent, or Firm*—Daniel M. Stock; Roger L. May

[57] ABSTRACT

An improved mounting assembly for automotive body panels includes a mounting plate (22) adjustably, fixably secured to an inner panel (16) and a slide plate (24), adjustably fixedly secured to an outer panel (12) and a slide arrangement (26) defined between the mounting plate (22) and slide plate (24) for facilitating adjustable movement therebetween.

16 Claims, 3 Drawing Sheets

MOUNTING ARRANGEMENT FOR AUTOMOTIVE VEHICLE BODY PANELS

The present invention relates generally to mounting arrangements for automotive body panels, and more particularly to mounting arrangement providing for adjustability in a multiplicity of directions.

BACKGROUND OF THE INVENTION

In order to enhance an end user's appreciation of the quality of manufacture of an automotive vehicle, it is desired to mount the exterior decorative panels of the vehicle in an accurate manner that provides for flushness and consistent gaps between adjacent exterior body panels. The effecting of such accurate mounting can become a difficult task in the high volume manufacturing environment of the automotive industry. The exterior panels are typically formed as extremely large stampings or moldings and they must be fixed to internal structural members, often other massive stampings. The buildup of manufacturing tolerances between the associated underbody panels and exterior panels makes it necessary that there be a certain amount of adjustability in the final positioning of the exterior panels to provide the desired accurate mounting. This difficulty tends to be even more pronounced in larger vehicles such as medium and heavy trucks.

It is known in the prior art to provide such adjustability in the mechanical fixing of inner and outer body panels through the provision of elongated slots which cooperate with mechanical fasteners for setting the position of the exterior panel in relationship to the position of the fastener within the slot. U.S. Pat. No. 4,973,102 to Bien is exemplary of such approach. In the adjustable mounting arrangement of Bien, adjustable positioning longitudinal of the vehicle is permitted. It is also known to provide such slotting for vertical adjustable positioning of some surfaces.

Not taught or suggested in the prior art, however, is the provision of a mounting arrangement that provides for simple and economical adjustable positioning in a multiplicity of directions to ensure the most accurate positioning possible.

SUMMARY OF THE INVENTION

Responsive to the deficiencies in the prior art, the present invention advantageously provides in the environment of a body assembly having an inner panel and an outer panel a first plate adjustably fixedly secured to the inner panel, adjustably positioned longitudinal of the vehicle, a second plate adjustably fixedly secured to the outer panel, and adjustably positionable vertically of the vehicle and a slide channel mechanism defined on the two plates for guiding longitudinal and vertical movement therebetween.

According to another feature of the present invention the second plate may include structure permitting the adjustable fixing of the position of the second plate laterally of the vehicle.

It is an object of the present invention to provide an automotive body assembly having an inner and outer panel and including an adjustable mounting means disposed between the inner and outer panels, including means for adjusting the vertical, longitudinal and lateral positions of the outer panel with respect to the inner panel.

BRIEF DESCRIPTION OF THE DRAWINGS

These and other features and objects of the present invention will be apparent to those skilled in the automotive body arts by reading the following description with reference to the accompanying drawings in which.

DESCRIPTION OF THE PREFERRED EMBODIMENT

Figure 1:
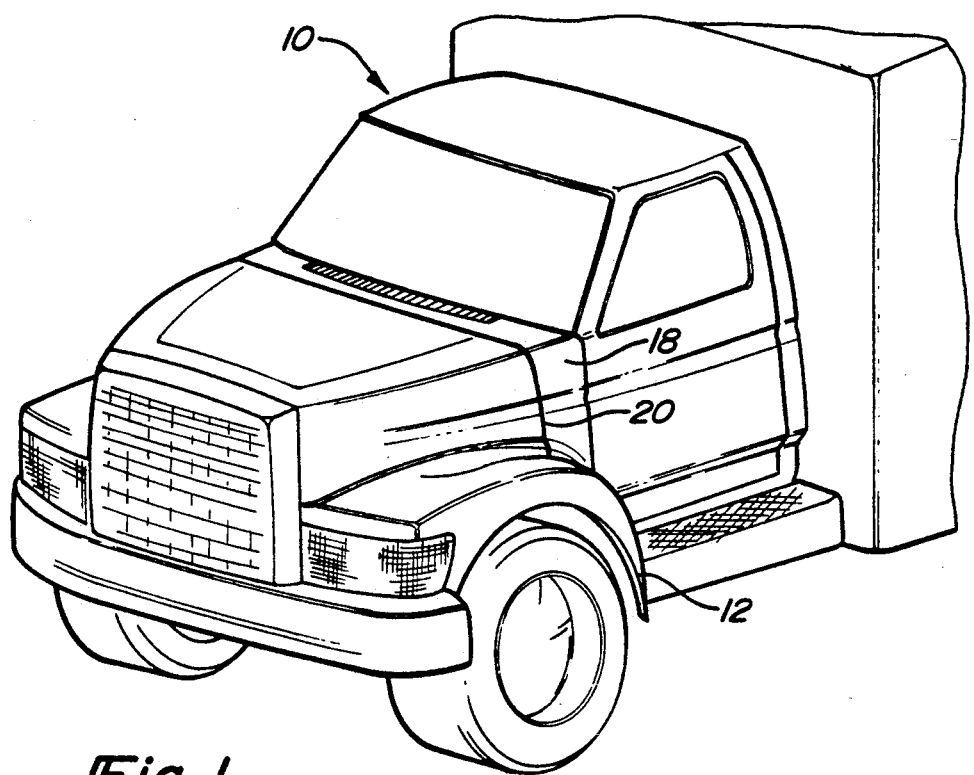
FIG. 1 is a perspective view of a truck illustrating final assembly of the truck body panels.
Figure 2:
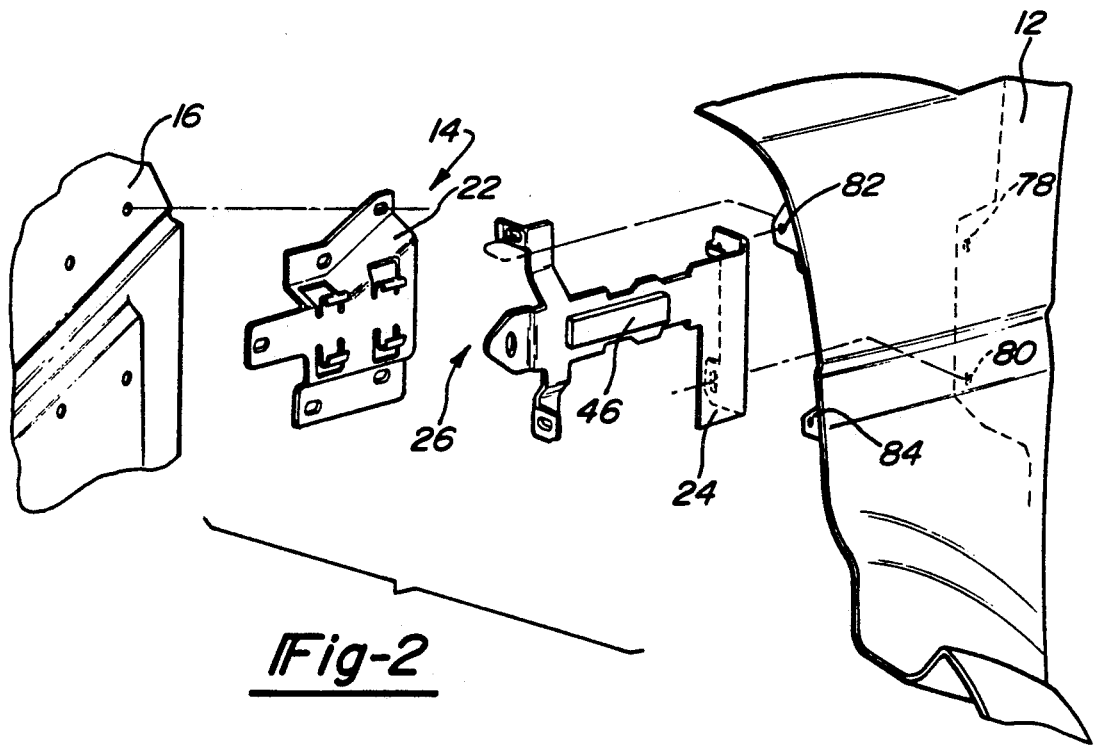
FIG. 2 is an exploded view of the mounting arrangement to the present invention illustrating installation of the truck fender with respect to its under body.

Turning now to the drawings, in particular, to FIGS. 1 and 2, a truck 10 is illustrated as including a fender or outer panel 12, that is secured through an adjustable mounting assembly 14 to an inner panel 16. It will be appreciated that the positioning of the fender 12 on the truck 10 in an accurate manner must permit the adjustable positioning of the fender 12 with respect to adjacent body panels such as the cowl 18 to provide a smooth and consistent transition between the cowl 18 and the fender 12 along the line 20. The present invention provides for adjustments vertically, longitudinally and laterally of the truck 10 and, in fact, as will become clear later, permits a certain amount of rotational positioning in a vertical, longitudinal plane, as defined by the mounting assembly 14.

The mounting assembly 14 comprises generally a first, mounting plate 22 and a second, slide plate 24. The mounting plate 22 and the slide plate 24 together define a slide-and-channel arrangement indicated generally at 26 through which the slide plate 24 is received for sliding movement with respect to the mounting plate 22. This sliding movement is permitted longitudinally, vertically and rotationally in the longitudinal vertical plane defined by the slide-and-channel arrangement 26.

Figure 3:
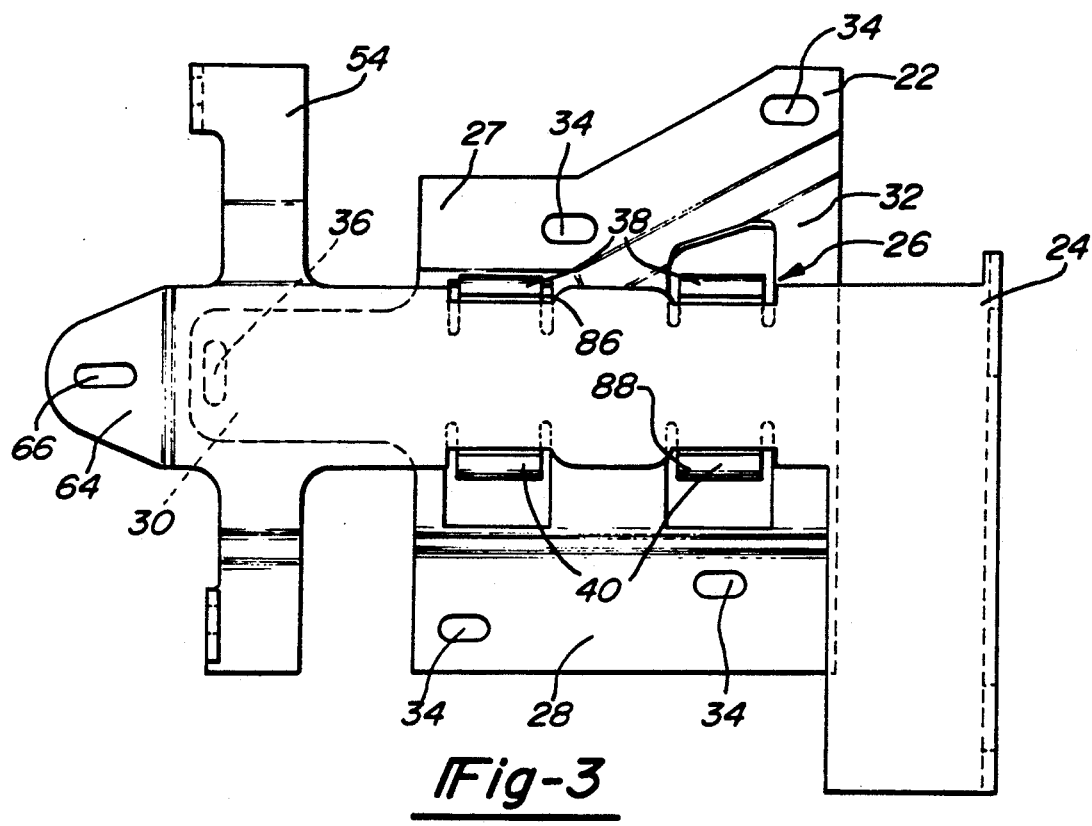
FIG. 3 is a side view of the mounting arrangement prior to final adjustment and positioned between inner and outer body panel.
Figure 4:
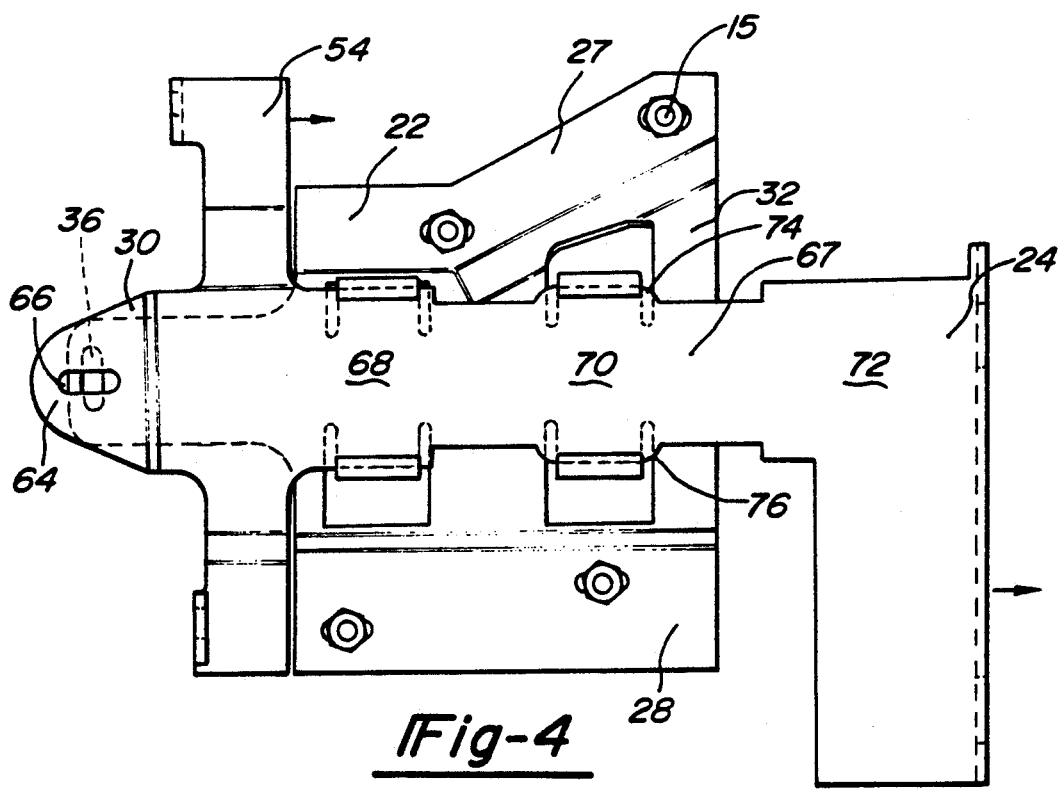
FIG. 4 is a side view similar to FIG. 3 showing final positioning.
Figure 5:
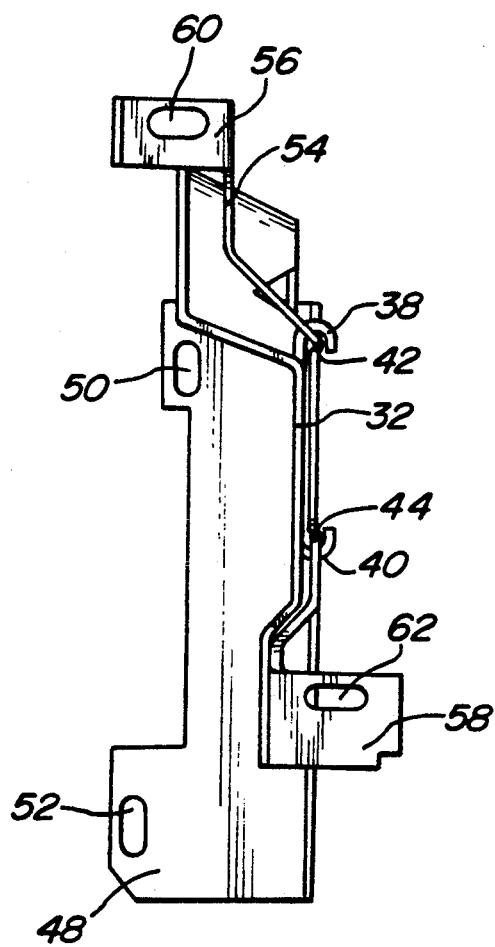
FIG. 5 is an end view of the mounting assembly of the present invention.

Turning now to FIGS. 3 to 5, the mounting plate 22 is illustrated as a stamping, having an upper mounting flange 27, and lower mounting flange 28, a forward mounting flange 30, and a raised central section 32. A plurality of longitudinally extending slots 34 are formed through the upper and lower mounting flanges 27, 28 and a vertically extending slot 36 is formed through the forward mounting flange 30. Upper and lower tabs 38, 40, respectively, are struck out through the raised central section 32 and rolled over to define upper and lower slide planes 42, 44, respectively.

The slide plate 24 is illustrated as comprising a stamping to which a resilient cushion 46 is adhesively secured. The stamping includes a laterally turned-in rear mounting flange 48, having upper and lower vertically elongated slots 50, 52 formed therethrough. It also includes a forwardly positioned mounting flange 54, which includes laterally turned upper and lower tongues 56, 58 respectively, through which are formed laterally extending slots 60, 62. It further includes a forwardmost mounting flange 64, having a longitudinally extending slot 66 formed therethrough. Intermediate the rear mounting flange 48 and the forwardly positioned mounting flange 54 is a slide portion 67, having three vertical protrusions 68, 70, 72, formed thereon. The vertical extent of the protrusions 68, 70, 72, is slightly less than the vertical spacing between the upper and lower slide planes 42, 44 of the mounting plate 22. In addition, the central protrusion 70 is illustrated as defining the upper and lower arcuate surfaces 74, 76.

To assemble the fender 12 to the inner panel 16, the mounting plate 22 is fixedly secured to the inner panel 16 through conventional fasteners 15 (shown only in FIG. 4) being inserted through the slots 34 and longitudinally positioned to a desired location established by a known checking fixture in the assembly plant. Similarly, the slide plate 24 is fixed to the fender 12 using conventional fasteners (not shown), the vertical slots 50, 52 of the rear mounting flange 48 being positioned over upper and lower fastener receiving apertures 78, 80 respectively and vertical adjustment to the fixture being effected. Forward upper and lower fastener receiving apertures 82, 84, respectively, are placed in general registration with the upper and lower laterally extending slots 60, 62 of the forwardly positioned mounting flange 54 to permit lateral adjustment. The fender 12 with the slide plate 24 is then presented to the inner panel 16 with mounting plate 22 fixed thereon in nested relationship as shown in FIG. 3. The central vertical protrusion 70 is positioned between two pockets 86, 88, defined by struck out portions 38, 40, so that lateral insertion into planar sliding engagement between the slide portion 66 and the mounting plate 22 is permitted, as may best be seen in FIG. 4. The fender is then moved longitudinally as defined by the slide planes 42, 44, with certain vertical movement being permitted between the protrusions 68, 70, and the pockets 86, 88, to a position approximately like that shown in FIG. 4 in which there is registration between the longitudinally elongated slot 66 of the slide plate 24 and the vertically elongated slot 36 of the mounting plate 22. Another conventional locking fastener may be applied at this point to fix the orientation between the plates and, hence, the position of the fender 12 on the vehicle 10. The resilient cushion 46 on the slide plate 24 is positioned in abutting relationship with the fender 12 to reduce the transmission of vibration between the parts.

While only one embodiment of the invention assembly has been disclosed, others may occur to those skilled in the automotive body art without departing from the scope of the following claims.

What is claimed is:

1. In a body assembly for an automotive vehicle having a inner panel and an outer panel, an improved mounting assembly comprising:
   a first mounting plate fixedly secured to the inner panel and including first means for adjustably fixing the position of the first plate with respect to the inner panel longitudinally of the vehicle;
   a second slide plate fixedly secured to the outer panel and including second means for adjustably fixing the position of the second plate with respect to the outer panel vertically of the vehicle;
   means defining a channel in the first plate; and
   means defining slide surfaces on the second plate, slidably received in the channel for longitudinal and vertical movement therewithin.

2. An improved mounting assembly as defined in claim 1 and further comprising third means for adjustably fixing the position of the second plate with respect to the outer panel laterally of the vehicle.

3. An improved mounting assembly as defined in claim 1, wherein the channel defining means comprises a pair of longitudinally spaced pockets defining an upper slide plane and a lower slide plane and the slide surface defining means comprises a pair of longitudinally spaced, vertical protrusions on the second plate.

4. An improved mounting assembly as defined in claim 2, wherein the channel defining means comprises a pair of longitudinally spaced pockets defining an upper slide plane and a lower slide plane and the slide surface defining means comprises a pair of longitudinally spaced, vertical protrusions on the second plate.

5. An improved mounting assembly as defined in claim 3, wherein the vertical protrusions are so longitudinally spaced to permit lateral insertion of the slide surface defining means into positions longitudinally slidingly engaging with the pockets.

6. An improved mounting assembly as defined in claim 4, wherein the vertical protrusions are so longitudinally spaced to permit lateral insertion of the slide surface defining means into positions longitudinally slidingly engaging with the pockets.

7. An improved mounting assembly as defined in claim 3, wherein the vertical extent of at least one of the protrusions is less than the vertical spacing between the upper and lower slide planes.

8. An improved mounting assembly as defined in claim 4, wherein the vertical extent of at least one of the protrusions is less than the vertical spacing between the upper and lower slide planes.

9. An improved mounting assembly as defined in claim 1, wherein the first means for adjustable fixing comprises a plurality of vertically spaced slots formed through the first plate and extending longitudinally of the vehicle and adapted to receive locking fasteners therein for engagement with the inner panel.

10. An improved mounting assembly as defined in claim 1, wherein the second means for adjustably fixing comprises a pair of vertically spaced vertically extending slots formed through the slide plate adjacent one longitudinal end thereof, and a single longitudinally extending slot longitudinally spaced from the pair of vertically extending slots, each of the slots being adapted to receive locking fasteners therein.

11. An improved mounting assembly as defined in claim 10, wherein the single longitudinally extending slot is positioned vertically intermediate the pair of vertically extending slots and wherein another vertically extending slot is formed through the first plate for registration with the single longitudinally extending slot of the second plate.

12. An improved mounting assembly as defined in claim 2, wherein the third means for adjustably fixing comprises means defining a laterally extending flange on the second plate, the flange including at least one laterally extending slot formed therethrough, adapted to receive a locking fastener for engagement with the outer panel.

13. An improved mounting assembly defining claim 5, wherein one of the protrusions includes arcuate surfaces formed thereon to facilitate rotative adjusting movement of the second plate with respect to the first plate.

14. An automotive body assembly comprising:
    an outer panel;
    an inner panel; and
    adjustable mounting means operatively disposed between the outer and inner panels, and including means for adjusting vertical, longitudinal and lateral positions of the outer panel with respect to the inner panel.

15. An automotive body assembly as defined in claim 14, wherein the adjustable mounting means comprises a pair of plates, each adjustably fixedly secured to one of the panels in facing relationship and a slide-and-channel connection defined therebetween for permitting relative adjusting movement.

16. An automotive body assembly as defined in claim 15 and including cushion means operatively disposed between the adjusting means and at least one of the panels.

* * * * *